United States Patent [19]

Möllerstedt et al.

[11] 3,806,586

[45] Apr. 23, 1974

[54] PROCESS FOR PRODUCING HIGHER YIELDS OF SILICON

[75] Inventors: B. P. Olov Möllerstedt; Karl-Eric Bäckius, both of Ljungaverk, Sweden

[73] Assignee: KemaNord AB, Stockholm, Sweden

[22] Filed: June 14, 1971

[21] Appl. No.: 153,028

[30] Foreign Application Priority Data
Jan. 19, 1971 Sweden.................................. 568/71

[52] U.S. Cl..................................... 423/350, 75/148
[51] Int. Cl. . C01b 33/00, C01b 33/02, C02c 31/00
[58] Field of Search ........... 423/348, 349, 350, 332, 423/492; 75/148

[56] References Cited
UNITED STATES PATENTS

| | | | |
|---|---|---|---|
| 869,276 | 10/1907 | Tone................................... | 423/350 |
| 1,028,151 | 6/1912 | Tone................................... | 423/350 |
| 1,061,256 | 5/1913 | Allen et al. ......................... | 423/350 |
| 1,293,008 | 2/1919 | Blardone............................ | 423/332 |
| 2,047,614 | 7/1936 | Cavezzale et al................... | 423/332 |

FOREIGN PATENTS OR APPLICATIONS 18,659    7/1900    Great Britain..................... 23/223.5

*Primary Examiner*—Edward Stern
*Attorney, Agent, or Firm*—Fred C. Philpitt

[57] ABSTRACT

This invention involves increasing the yield in the production of silicon or silicon alloys in melting furnaces by admixing the effluent dust with an alkali metal hydroxide and reintroducing the admixture into the melting furnace.

11 Claims, No Drawings

PROCESS FOR PRODUCING HIGHER YIELDS OF SILICON

BACKGROUND

In the production of silicon by the reduction of silica in an electric resistance arc furnace at high temperatures, a very finely divided dust containing $SiO_2$ as a wasteproduct is produced. This dust is formed by volatilization of the reaction products. Since the efficiency of the furnace is usually between 60-85%, considerable amounts of this dust are being formed. The dust mainly consists of $SiO_2$. In addition, particles with the stoichiometric composition SiO consisting of homogenous grains of $SiO_2$ and Si can also be found.

Because of the great public concern relative to the ecology and specifically the problem of air-pollution, various methods have been proposed to reduce the large amounts of exhausts from plants of the type discussed above. Different types of purification equipment such as electrostatic precipitators, bag filters and cyclones have been used for preventing air-pollution.

Although the removal of the silica dust from the exhaust fumes according to the above methods greatly reduces the air-pollution problem, such removal creates the problem of disposing of large heaps of the waste product. Although various uses for the silica dust have been suggested, such as an anti-caking agent for fertilizers, or as a filler or the like, these applications can only dispose of a small fraction of the amount of dust provided by the purification equipment. Consequently the silica dust has to be stored somewhere around the plant, thus presenting a new problem concerning environmental care.

It has been realized that the recirculation of this dust to a melting furnace would not only eliminate the storage and disposal problem but would greatly increase the total yield of the reduction process. However, no successful method for recirculating the dust back to the melting furnace has been proposed heretofore.

SUMMARY OF THE INVENTION

Considered from one aspect, the present invention relates to an improvement in the known method of producing silicon or silicon alloys by reducing silica-containing materials in an electric resistance arc furnace, which improvement comprises a simple and inexpensive procedure for increasing the yield of said which includes:

a. separating silica-containing dust from the gaseous exhaust exiting from the furnace,
b. admixing the separated silica-containing dust with an aqueous alkali metal hydroxide,
c. forming said admixture into granules,
d. drying said granules at a temperature above 60°C.,
e. reintroducing at least a portion of said dried granules back into said furnace,
f. the amount of the alkali metal in the said dried granules being between about 0.1% and about 10% by weight based on the weight of the silica.

Accordingly, the present invention provides a very simple and inexpensive method which is useful for increasing the yield in the production of silicon or silicon alloys. Since the separation of silica containing dust from the exhaust in the existing purification plants is nearly 100%, the subsequent production of the granules therefrom results in practically no loss at all of silica dust. Therefore, the present invention makes it possible to increase the total yield of silicon or silicon alloys (such as ferro-silicon, silicon-manganese, silicon-chromium, etc.) by 15-40%.

DESCRIPTION OF PREFERRED EMBODIMENTS

The silica-containing dust treated according to the present invention is obtained by separating it from the waste exhausts from the reduction of silica-containing materials to silicon or silicon alloys. The reduction is performed in melting furnaces, and particularly in electric resistance arc furnaces. The silica-containing dust is separated from the exhausts by any conventional separation means such as electrostatic precipitators, bag filters or cyclones. The silica dust obtained from the exhaust fumes from silicon furnaces has a particle size mainly in the interval from about 0.1-5 μm. Some particles, however, have grain sizes up to 1 mm. The surface area of the particles is 15-25 $m^2/g$. The particles are present in an amorphous state and are generally spherical.

The aqueous alkali metal hydroxide may be any aqueous alkali metal hydroxide such as sodium hydroxide and potassium hydroxide. The preferred hydroxide is sodium hydroxide. The content of alkali metal in the dried product should be at least about 0.1% by weight based on the silica dust. The upper limit is not crucial. However, advantageously, the content of alkali metal in the granules is kept as low as possible since the alkali metal can form soluble silicates by reaction with the furnace lining, causing corrosion. Preferably the dried granules contain about 0.1-10% by weight of alkali metal, and most preferably 0.5-3% by weight, based on the weight of the silica dust. The alkali metal hydroxide is added to the silica dust as an aqueous solution. The concentration of the alkali metal hydroxide in the aqueous solution is preferably from about 1-10% by weight and most preferably 2-5% by weight.

The use of an alkali metal hydroxide as a binder for the dust is advantageous as compared with other suitable materials since the alkali metal burns completely in the furnace. Therefore contamination of the silicon does not occur. Also slag does not form which would cause corrosion of the furnace lining.

The mixing and forming of the silica dust with the alkali metal hydroxide can be accomplished in any suitable manner. Any known apparatus, such as a blade granulator, a pan granulator, a barrel granulator or a kneading machine in combination with a granule forming device can be used. In the mixing step it is preferred to maintain a wet:dry ratio of 1:1-5:1 on a weight basis. The term "wet" means the alkali metal hydroxide solution, and the term "dry" means the silica dust together with any material returned with it from previous granulating operations.

The granulation can be accomplished in either a cold or warm state, and generally at a temperature below about 95°C, and preferably at a temperature of about 10°-30°C. Thereafter the obtained granules are dried at a temperature of at least 60°C. The upper limit for the drying temperature is not critical and any available drying means can be used. The drying is preferably carried out at a temperature of about 95°-400°C. It is also important that the silica dust particles are evenly moistened with the alkali metal hydroxide. By using too low drying temperatures or using materials such as calcium hyroxide, the granules obtained possess poor mechanical strength and are not suitable for charging to a melting furnace.

The drying is preferably accomplished with dry air to prevent the granules from containing moisture. In the charging step the granules should generally have a moisture content below about 15% by weight, and preferably below about 5% by weight.

The granulating step can also be accomplished at elevated temperatures whereby a partial binding is obtained. By such a process the temperature of the granulating liquid should be about 80°–100° C. If desired the granules can be briquetted before the drying process.

A small amount of silica dust can also suitably be dissolved in the alkali metal hydroxide before the actual admixing with the major part of silica dust takes place. In this manner a final product having still further improved mechanical strength is obtained.

It has also been found that the addition of silica sand to the silica dust and alkali metal hydroxide composition provides granules having good mechanical strength. By the term "silica sand" is meant mineral grains containing a major amount of $SiO_2$ and having a grain size essentially below 2 mm, such as sea sand or glass sand. Amounts of up to about 50% by weight of silica sand and preferably up to about 30% by weight can be included in the pasty product prepared by mixing silca dust from melting furnaces with the aqueous alkali metal hydroxide without considerably reducing the high mechanical strength or thermal strength of the dried granules. In preparing granules containing silica sand, the mixing ratio dry to wet should lie in the range of about 2:1–10:1 on a weight basis. In such instances the granules should contain at least about 0.1% and preferably about 0.1–10% by weight of alkali metal and most preferably about 0.5–3% by weight. The introduction of silica sand to melting furnaces has hithertofore been impossible since it has not been possible previously to provide products stable enough to resist the mechanical stresses encountered when the same are brought into contact with the hot contents of the furnace.

EXAMPLES

The following examples are illustrative of preferred embodiments of the present invention. It should be understood that these examples are not intended to limit the invention and obvious changes may be made by those skilled in the art without changing the essential characteristics and the basic concept of the invention. The parts and percentages are by weight, the temperature is room temperature and the pressure is atmospheric, unless otherwise indicated.

EXAMPLE 1

30 kg of silica dust from an electrostatic precipitator connected to a silicon furnace, the dust having a particle size mainly in the interval 0.1–5 $\mu m$, was granulated at 20°C. on a pan granulator with 18 liters of 3% aqueous NaOH. The material was dried for 4 hours at 120°C. and a granule fraction of 15–25 mm was separated by sieving. A compression strength test was carried out on separate granules by compressive loading the granules on a tared scale. The strength expressed in terms of the load in kg by collapse was 44.0 kg. The thermal shock strength was determined by placing the granules in a furnace at 1,400°C. No decomposition was noted.

EXAMPLE 2

30 kg of silica dust from the exhaust of a silicon furnace was mixed with 18 liters of 3% NaOH in a kneader machine at 20° C. for 10 minutes, whereby a pasty mass was obtained. 20 kg of the mass was formed into balls having a diameter of 20 mm and dried at 120° C. for 4 hours. The compressive strength, measured as in Example 1, was 90 kg. No decomposition was noted at 1,400° C.

EXAMPLE 3

30 kg of silica dust obtained from the exhaust of a silicon furnace was mixed with 18 liters of 3% $Ca(OH)_2$ in a kneader machine at 20° C. for 10 minutes, whereby a pasty product was obtained. The product was formed into balls having a diameter of 20 mm and said balls were dried at 120°C for 4 hours. The compressive strength measured as in Example 1 was 18 kg. All the balls decomposed into a fine powder at 1,400°C.

As illustrated by this example, by using $Ca(OH)_2$ it is not possible to produce granules which are mechanically stable at 1,400°C, i.e., the temperature that the charged material is subjected to in the furnace. The compressive strength at room temperature also was considerably lower for granules made from silica dust granulated with $Ca(OH)_2$ than for granules made according to the present invention.

EXAMPLE 4

10 kg of the mass prepared according to Example 2 before granulating was mixed at 20° C. with 10 kg. of silica sand having a particle size below 0.5 mm for 10 minutes. The obtained paste was formed into granules having a diameter of 20 mm and said granules were dried at 120°C. for 4 hours. The compressive strength measured as in Example 1 was 70 kg. No decomposition at 1,400° C was noted.

EXAMPLE 5

0.5 kg of silica dust was dissolved in 18 liters of 2% NaOH and the solution was granulated on a pan granulator at 20° C. together with 30 kg of silica dust. The material was dried at 120° C. for 4 hours and a granule fraction of 15–25 mm was removed by sieving. The compressive strength, measured as in Example 1, was 80 kg. No decomposition at 1,400° C. was noted.

EXAMPLE 6

In an electric resistance arc furnace having an effect of 5 MW and provided with carbon electrodes for producing silicon, 15 weight percent of the charged amount of crushed quartz was replaced by the granules prepared according to Example 1. The yield of the furnace process remained unchanged, i.e., the charged granules neither decomposed nor exited as dust but took place in the reduction process. The sodium content in the produced silicon increased only 10 ppm, which does not adversely affect the quality of the final product.

In conclusion, while there has been illustrated and described some preferred embodiments of the invention, it is to be understood that since the various details of construction may obviously be varied considerably without really departing from the basic principles and teachings of this invention, there is no intention to limit the invention to the precise constructions herein disclosed and the right is specifically reserved to encompass all changes and modifications coming within the scope of the invention as defined in the appended claims.

Having thus described the invention, what is claimed is:

1. In the known method of producing silicon or silicon alloys by reducing silica-containing materials in an electric resistance arc furnace, the improvement which comprises increasing the yield of said method by:
   a. separating silica-containing dust from the gaseous exhaust exiting from the furnace,
   b. admixing the separated silica-containing dust with an aqueous alkali metal hydroxide,
   c. forming said admixture into granules,
   d. drying said granules at a temperature above 60°C., and
   e. introducing at least a portion of said granules back into an electric furnace for reducing silica-containing materials,
   f. the amount of the alkali metal in the said dried granules being between about 0.1% and about 10% by weight based on the weight of the silica,
   g. the moisture content of said granules being below about 15%.

2. In the known method of producing silicon or silicon alloys by reducing silica-containing materials in an electric resistance arc furnace, the improvement which comprises increasing the yield of said method by:
   a. separating amorphous silica-containing dust particles from the gaseous exhaust exiting from the furnace, said silica-containing dust having a particle size of from about 0.1 – 5 μm and a surface area of 15 – 25 m.²/g,
   b. admixing the separated silica-containing dust with 1. an aqueous solution of alkali metal hydroxide as a binder, the concentration of the alkali metal hydroxide in the aqueous solution being from 1 – 10% by weight, and
   2. silica sand in an amount up to 30% by weight, said silica sand having a grain size essentially below 2 mm and being selected from the group consisting of sea sand and glass sand, the mixing ratio of dry to wet being within the range of about 2:1 to 10:1 on a weight basis,
   c. forming said admixture into granules at an temperature within the range of about 10°–30°C.,
   d. drying said granules with dry air at a temperature between about 60° – 400°C until the moisture content is below about 15% by weight and the amount of the alkali metal content in the said dried granules being between about 0.5 and about 3% by weight based on the weight of the silica,
   e. and reintroducing at least a major portion of said granules back into said furnace.

3. In the known method of producing silicon or silicon alloys by reducing silica-containing materials in an electric resistance arc furnace, the improvement which comprises increasing the yield of said method by:
   a. separating amorphous silica-containing dust from the gaseous exhaust exiting from the furnace, said silica-containing dust having a particle size of from about 0.1 – 5 μm and a surface area of 15 – 25 m.²/g,
   b. admixing the separated silica-containing dust with an aqueous solution of alkali metal hydroxide as a binder, the concentration of the alkali metal hydroxide in the aqueous solution being from 1 – 10% by weight, and the wet:dry ratio being 1:1 to 5:1 on a weight basis,
   c. forming said admixture into granules at a temperature within the range of about 10° – 30°C.,
   d. drying said granules with dry air at a temperature between about 60° – 400°C. until the moisture content is below about 5% by weight and the amount of the alkali metal content in the said dried granules being between about 0.1% and about 10% by weight based on the weight of the silica,
   e. and reintroducing at least a major portion of said granules back into said furnace.

4. In the known method of producing silicon or silicon alloys by reducing silica-containing materials in an electric resistance arc furnace, the improvement which comprises increasing the yield of said method by:
   a. separating silica-containing dust from the gaseous exhaust exiting from the furnace,
   b. admixing the separated silica-containing dust with an aqueous alkali metal hydroxide,
   c. forming said admixture into granules,
   d. drying said granules at a temperature above 60°C. until the moisture content is below about 15%, and the amount of the alkali metal content in the said dried granules being between about 0.1% and about 10% by weight based on the weight of the silica,
   e. and reintroducing at least a major portion of said granules back into an electric arc furnace for reducing silica containing materials.

5. The improved method according to claim 4 wherein the alkali metal content of (d) is 0.5 – 3% by weight.

6. The improved method of claim 4 wherein the silica dust of (a) has an average particle diameter of 0.1 – 5 μm.

7. The improved method of claim 4 wherein up to 50% by weight of silica sand with an average particle diameter smaller than 2 mm. is added to the mass of silica dust and aqueous alkali metal hydroxide prior to drying of the granules.

8. The improved method according to claim 4 wherein the aqueous alkali metal hydroxide set forth in step (b) has a conentration of about 1 – 10% by weight.

9. The improved method according to claim 4 wherein the aqueous alkali metal hydroxide set forth in step (b) has a concentration of about 2 – 5% by weight.

10. The improved method according to claim 4 wherein the wet to dry ratio utilized in forming the granules in steps (b) and (c) is within the range of about 1:1 – 1:5.

11. The improved method according to claim 4 wherein the drying temperature of step (d) is within the range of about 95° – 400°C on a weight basis.

* * * * *